Jan. 22, 1946. L. EDELMANN 2,393,523
THERMOHYDROMETER
Filed July 5, 1943 2 Sheets-Sheet 1
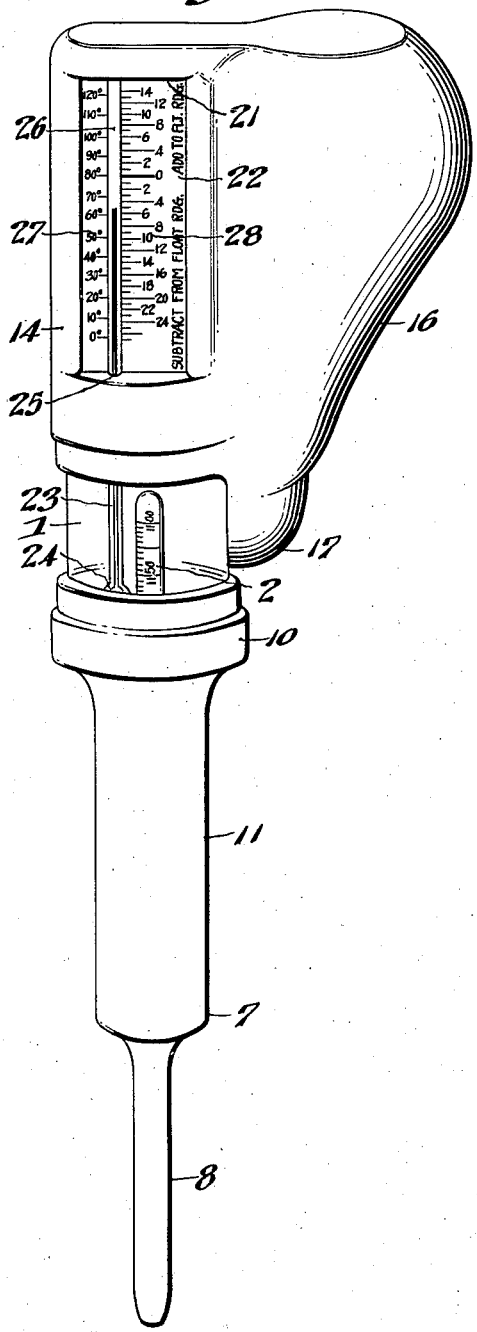
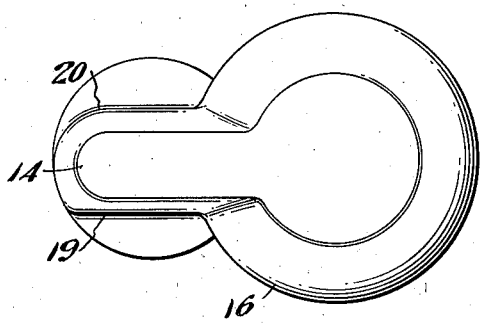
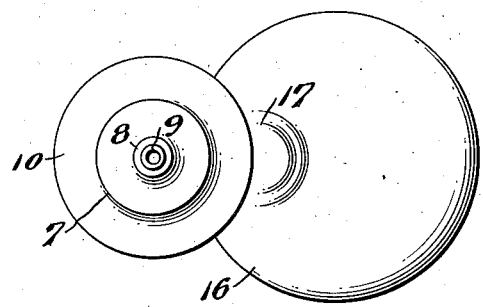
Inventor
Leo Edelmann
By Lloyd W. Patch
Attorney Jan. 22, 1946.   L. EDELMANN   2,393,523
THERMOHYDROMETER
Filed July 5, 1943   2 Sheets-Sheet 2
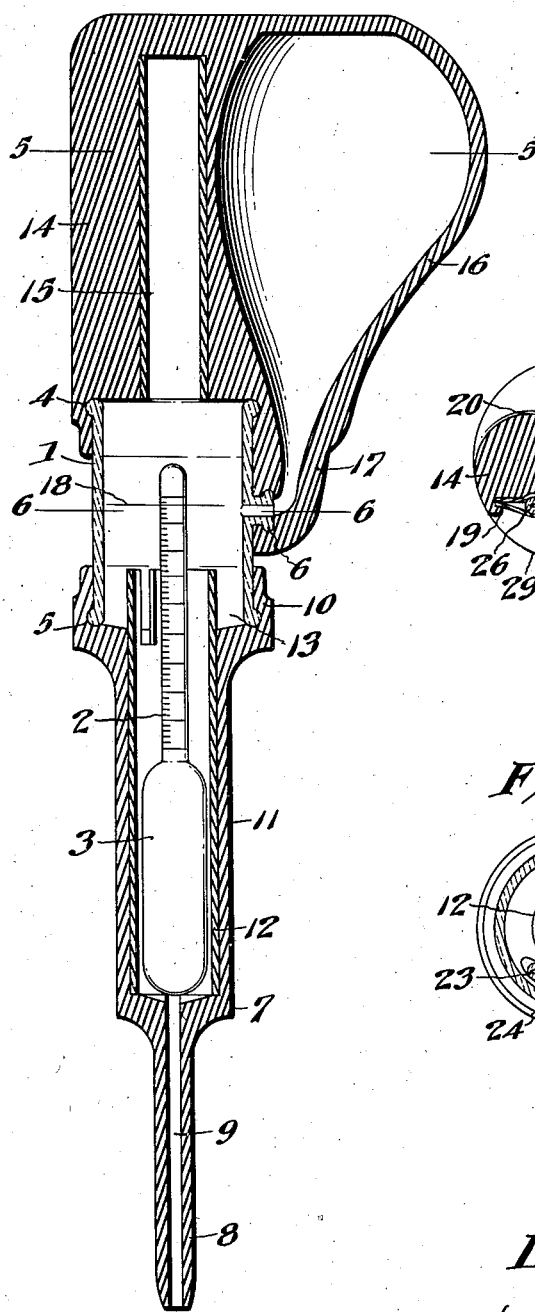
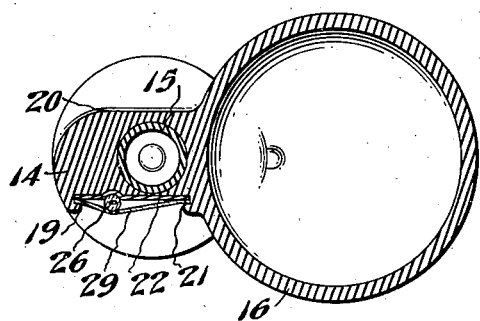
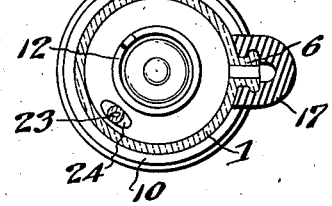
Inventor
Leo Edelmann
By Lloyd W. Patch
Attorney Patented Jan. 22, 1946

2,393,523

UNITED STATES PATENT OFFICE 2,393,523

THERMOHYDROMETER

Leo Edelmann, Chicago, Ill.

Application July 5, 1943, Serial No. 493,575

3 Claims. (Cl. 73—34)

This invention pertains to thermohydrometers, and particularly to a syringe hydrometer of the type ordinarily employed in testing radiator antifreeze solutions, battery solutions, and other liquid solutions.

An object of my invention is to provide a thermohydrometer instrument which is of small size and which is compact and is more or less streamlined, thus avoiding a large cumbersome bulk or structure which can often be used only with greatest difficulty due to the limited space within which batteries, jars and other containers for the liquid to be tested are placed.

Another purpose is to so construct my improved thermohydrometer instrument that all exterior portions can be made of plastic, rubber, or other materials of non-frangible character, and materials that will not be readily damaged under ordinary conditions of use or by dropping or other ordinary accidents or shocks to which the instrument may be subjected while being handled and used.

Still another object is to provide a thermohydrometer in which the float element and the thermometer, parts of which are now most conveniently of glass, will be housed and protected against breakage and damage, and in which there is no possibility of two glass parts or surfaces or two portions of readily frangible material contacting.

Yet another object is to provide a syringe type of hydrometer in which the suction bulb is disposed laterally of the housing portions so that the overall length of the instrument is accordingly reduced, and yet the suction bulb is presented in manner to be readily grasped for holding the instrument for taking a test and for reading the indications of the float element and thermometer, the bulb at the same time being fully accessible for manipulation to draw in and expel a test quantity of liquid.

Yet another purpose is to so construct the hydrometer that a very short liquid barrel can be employed, the construction insuring that the test quantity of liquid will always be at a predetermined level during the test, and the portions of the float element and the thermometer being located and disposed in such relation that these indications can be readily viewed and can be read together in the same field of vision while the instrument is being held with the hand of the user conveniently grasping the bulb for manipulation to draw in and expel the test quantity of liquid.

With the above and other objects in view, some of which will be apparent to those skilled in the art, and others of which are inherent in the construction and operation and use of the instrument, my invention includes certain novel features of construction and combinations and arrangements and associations of parts which will be hereinafter set forth in connection with the drawings and then pointed out in the claims.

In the drawings:

Figure 1 is a perspective view of a thermohydrometer embodying my invention, looking at the side of the instrument that would be viewed in taking a reading.

Fig. 2 is a top plan view.

Fig. 3 is a bottom plan view.

Fig. 4 is a longitudinal sectional view through the instrument.

Fig. 5 is a transverse sectional view substantially on line 5—5 of Fig. 4.

Fig. 6 is a transverse sectional view substantially on line 6—6 of Fig. 4.

With my invention, the primary purpose of the transparent barrel 1 is that it be available to permit viewing of the indicating stem 2 of the hydrometer float element 3, and by reason of the fact that the main bulk of the test quantity of liquid and the main length of the hydrometer float element will be accommodated in other portions of the structure this transparent barrel 1 can be made relatively short.

It is contemplated that the barrel 1 can be made up by molding, or otherwise, of a suitable transparent plastic material, of glass, or of any other suitable material that will give a clear view of the scale or indications on the indicating stem portion 2 of the float element 3. The barrel 1 is preferably provided with the usual bead formations 4 and 5 at its ends, and has a laterally extending connecting nipple 6 intermediate these ends.

A nozzle member 7 is provided at its lower end with a nozzle tip 8 having a liquid opening or passage 9 therethrough, and at its upper end has a connecting sleeve portion 10 for connection with the lower end of the barrel 1. Intermediate the tip portion 8 and the connecting portion 10, the nozzle 7 is provided with a float element and liquid housing 11, which is substantially aligned with and presented below the barrel 1. A protecting and guide sleeve 12 is presented within the opening of the housing 11, and this sleeve is of sufficient size to receive and house the float bulb portion of the float element 3 to permit free movement of the float element and to yet prevent side twisting or tilting, thus protecting the float element when the instrument is not in use and insuring that the float element will ride or float in upright relation when the instrument is in use. As shown, this lining guide sleeve 12 can have the upper end thereof extended upwardly slightly, as at 13, and the hydrometer float element 3 will thus be positively held against tilting or tipping in any position to which it may rise while in use.

An upper housing member 14 is connected at the upper end 4 of the barrel 1 and has therein an upper extension housing sleeve or opening 15 substantially aligned upwardly with the barrel 1 and the lower housing or guide sleeve 12. This housing sleeve or opening 15 will permit the float element 3 to rise to its maximum height for testing liquid within the housing 12 and barrel 1, and at the same time will protect the indicating gauge stem 2 of the float 3 both while the instrument is being handled and while in use.

The nozzle portion 7 and the upper housing portion 14 can both be conveniently made of rubber, or of other suitable material, and the housing or guide sleeve portions 12 and 15 can be made of hard rubber or other suitable material that will prevent breakage of the float element 3 and will offer protection for this element. At one side, the housing portion 14 has a bulb portion 16, which approximates the shape and construction of such bulbs as now ordinarily used upon syringe hydrometers, and this bulb portion is extended laterally so that the bulb portion can be readily and conveniently grasped within the hand for holding the instrument, and at the same time can be readily manipulated for drawing in and expelling a test quantity of liquid. Further, the bulb 16 when presented in this relation can be shaped exteriorly to be substantially streamlined to merge in with and conform to the general lines of the instrument and to present the lower portion thereof as an extension 17 having an opening to receive and connect with the nipple 6 of the barrel portion 1. With the syringe bulb portion 16 connected with the nipple 6 and thus communicating with the interior of the barrel 1, a test quantity of liquid can be drawn into the instrument through the passage 9 of the nozzle tip 8 to fill the lower housing casing 11 and rise within the barrel 1 to substantially the level as indicated at 18, which is the constant or fixed liquid level desired for convenient and accurate use of the instrument. With the syringe bulb 16 disposed laterally and presented to be conveniently grasped in the hand and manipulated, the capacity of the bulb can be made sufficient to insure that a full test quantity of liquid will be drawn into the instrument to bring the liquid level to the constant point at 18, and any excess liquid will be drawn through the nipple 6 into the syringe bulb 16. At the same time, with the parts constructed as described and shown, when the bulb 16 is compressed the test quantity of liquid will be expelled from the instrument and any excess of liquid that may have been drawn into the bulb 16 will be discharged along with the test quantity of liquid.

The lower nozzle and housing portion 7 and the upper housing and bulb portion 14 and 16 can be of rubber, or other suitable material, and the housing sleeves 12 and 15 can be of hard rubber, or of other suitable more rigid material, molded or vulcanized or cemented or otherwise secured in place. By reason of the fact that the suction bulb 16 is disposed and positioned laterally and alongside of the upper housing portions, the overall length of the instrument is materially shorter than in instruments as heretofore usually constructed. The housing sleeve 15 can be made of relatively smaller diameter than housing sleeve 12, since this sleeve 15 need have an internal diameter only sufficiently large to clear the stem portion 2 of the hydrometer float element 3, and consequently the suction bulb portion 16 can be made of a cross sectional shape quite similar to that of bulbs now ordinarily used upon syringe hydrometers. As the housing sleeve 15 is of relatively small diameter, the surrounding portions of the upper housing 14 can be quite considerably and materially reduced in thickness and bulk from front to back, in consequence of which the bulb portion 16 is presented with the greater portion of its outer portion exposed to permit the user to grasp this bulb portion in substantially the usual manner, between the fingers and the palm of the hand, or between the fingers and the thumb. The relatively narrow or thin portion of the housing 14 around the sleeve 15 will not offer appreciable thickness or obstruction to prevent the bulb 16 to be freely and substantially fully compressed. As shown, this portion of the upper housing 14 is very substantially reduced at its forward and back sides, as indicated at 19 and 20, and this will permit and insure maximum yieldability in the main body of the syringe bulb portion 16.

The forward side 19 of the upper housing extension 14 is provided with a recess 21 to receive or present a thermometer scale or indicating sheet or portion 22, and this scale portion 22 is thus disposed in an upright plane substantially over the barrel 1. A thermometer 23, of the tube type, has the lower bulb end 24 thereof disposed within the barrel 1 below the liquid level at 18, and the thermometer extends upwardly through an opening 25 in the housing member 14 to have its indicating portion 26 presented adjacent to and in front of the scale sheet or portion 22. In the present instance I have shown a hydrometer of the type ordinarily employed in testing battery solutions, and capable of use in connection with battery solutions at temperatures from 0° F. to 120° F. Since hydrometer float elements are ordinarily calibrated at 80° F., the indicating or gauge stem portion 2 of the float element 3 may be considered as being so calibrated.

As the thermometer scale or gauge portion 22 is marked off in the disclosure in Figure 1, the temperatures are indicated on the left hand side, as at 27, in the range as above set forth, and on the right hand side the scale shows correction indications to be added to or subtracted from the indications on the float stem or gauge portion 2. For example, where the top of the indicating column of the thermometer indicates a figure on the right hand portion 28 of the scale below the 80° F. marking on the left hand side of the scale, the figure as indicated will be subtracted from the float reading as shown on the stem 2 of the float element 3, and where the top of the indicating column of the thermometer rises above the 80° F. marking on the left hand scale, the corresponding figure as indicated on the right hand scale will be added to the float reading.

With the hydrometer structure of my present invention, the bulb portion 16 can be grasped in the hand in the usual manner and can be freely manipulated, after the manner of the usual syringe hydrometer bulb, to draw in and to expel a test quantity of liquid. With this suction bulb portion 16 disposed and positioned laterally and alongside of the upper housing portion 14, and with the indicating portion 26 of the thermometer 23 offset toward the opposite side, the instrument can be held or presented in position to be readily viewed and no part of the hand or fingers will ordinarily be over any indicating part of the gauge stem 2 or the thermometer indicating portion 26 or the scale markings at 27 and 28. As illustrated in Figure 1, the indicating portions are all presented on the forward side of the hydrometer instrument, and consequently as the bulb portion 16 is grasped in the right hand all of the indicating portions are presented to be read in a single field of vision. Consequently, the indications of the scale 28 can be observed substantially at the same instant that the readings on the float element scale stem 2 are noted, in consequence of which there will be little likelihood of visual error or of change or variation in temperature at which the two readings are taken.

If desired, a transparent cover 29 can be provided in front of and as a protection for the indicating portion 26 of the thermometer.

From the foregoing it will be seen that I have provided a syringe hydrometer structure of simple and compact construction, which can be substantially streamlined to reduce the size and the appearance of bulkiness, and which at the same time is of such construction that it can be held in the hand in position for use and for manipulation of the syringe bulb 16 in the usual manner, in which operation the indicating parts are substantially automatically and naturally presented in position to be read by the user in a single field of vision.

While I have herein shown and described only certain specific embodiments of my invention and have set forth only certain possible variations, it will be appreciated that many changes can be made in the form and construction and materials and the assembly of my improved structure, without departing from the spirit and scope of my invention.

I claim:

1. A thermohydrometer comprising a short transparent liquid barrel portion having a laterally extending connecting nipple at one side intermediate its ends, a nozzle member mounted at the lower end of said liquid barrel portion and provided with a liquid and float housing opening, an upper housing member connected at the upper end of the liquid barrel with the housing opening thereof of relatively smaller diameter than the housing opening of the nozzle member, a syringe bulb positioned and projecting laterally along one side of the upper housing portion and having the opening thereof entirely laterally of the upper housing opening, said bulb being provided with an extension connected at the connecting nipple of the liquid barrel, said upper housing member being reduced on its forward and rear sides to give clearance whereby the major portion of the bulb is available to be held and manipulated in usual manner, thermometer scale displaying means carried by the forward reduced side, a thermometer having a temperature influenced portion within the liquid barrel below the connecting nipple and having an indicating portion extending adjacent to said scale displaying means, and a float element movable within the aligned openings of said liquid barrel and upper and lower housings.

2. A thermohydrometer comprising a short transparent liquid barrel of relatively large diameter having a connecting nipple extending at one side intermediate its ends, a lower housing member connected at the lower end of said liquid barrel and having a liquid admission opening, a float element comprising a float bulb and a gauge stem, said lower housing member having the housing opening thereof of a diameter slightly greater than the float bulb portion whereby the float element is freely movable therein and is yet held against appreciable tipping, an upper housing member connected at the upper end of said liquid barrel and having a housing opening therein aligned with the housing opening of the lower housing member and of relatively smaller diameter to provide clearance for the gauge stem portion of the float element, a syringe bulb portion extending and disposed substantially entirely laterally with respect to and alongside of the upper housing opening and connected with the connecting nipple of said liquid barrel, said upper housing member having the forward and rear portions thereof appreciably reduced thereby providing for free access for the user to grasp and manipulate the syringe bulb, a thermometer scale displaying portion carried by the forward reduced side of said upper housing member, and a thermometer having a temperature influenced portion depending into the liquid housing below the connecting nipple and having an indicating portion extending upwardly alongside of the scale displaying portion, said thermometer being offset away from the bulb portion and thereby being disposed out of alignment with the gauge stem portion of the float element visible through the transparent liquid barrel whereby indications of the float element and of the thermometer can be clearly viewed and read in a single field of vision while the thermohydrometer is being held and supported by the syringe bulb portion in the hand of the operator in a position for manipulation and use.

3. A thermohydrometer comprising a transparent liquid and float barrel having a laterally extending connecting nipple at one side at a location corresponding substantially to a desired liquid level, a nozzle member at the lower end of said liquid barrel, a float element in said barrel, an upper housing member at the upper end of the liquid barrel provided with a housing opening substantially aligned with the liquid barrel in position to clear the upper portion of the stem of the float element, a syringe bulb positioned and projecting laterally along one side of the upper housing portion and having the displacement opening thereof entirely at one side of said housing, said bulb being provided with a depending extension connected at the connecting nipple of the liquid barrel, said upper housing member being reduced on its forward and rear sides and being made relatively thinner to give clearance whereby the major portion of the outer surface of the bulb is available to be grasped in the hand and manipulated in usual manner, thermometer scale displaying means carried by the forward reduced side of the housing, and a thermometer having a temperature influenced portion within the liquid barrel below the connecting nipple and having an indicating portion extending adjacent to said scale displaying means.

LEO EDELMANN.